US008820568B1

(12) United States Patent
Antos

(10) Patent No.: US 8,820,568 B1
(45) Date of Patent: Sep. 2, 2014

(54) TRASH CAN ASSEMBLY

(71) Applicant: James A. Antos, Bristol, WI (US)

(72) Inventor: James A. Antos, Bristol, WI (US)

( * ) Notice: Subject to any disclaimer, the term of this patent is extended or adjusted under 35 U.S.C. 154(b) by 0 days.

(21) Appl. No.: 13/964,710

(22) Filed: Aug. 12, 2013

Related U.S. Application Data

(63) Continuation-in-part of application No. 13/444,895, filed on Apr. 12, 2012, now abandoned.

(60) Provisional application No. 61/518,291, filed on May 3, 2011.

(51) Int. Cl.
*B65F 1/06* (2006.01)
*B65F 1/14* (2006.01)
*B23P 19/00* (2006.01)

(52) U.S. Cl.
CPC ................. *B65F 1/068* (2013.01); *B23P 19/00* (2013.01); *B65F 1/1426* (2013.01)
USPC .................................................... 220/495.06

(58) Field of Classification Search
CPC .............. B65F 1/06; B65F 1/04; B65F 1/163; B65F 1/1646; B65F 1/1623; B65F 1/16
USPC ......... 220/495.06, 263, 262, 260, 908.1, 908, 220/908.2, 495.01, 495.08; D34/9, 8, 7
See application file for complete search history.

(56) References Cited

U.S. PATENT DOCUMENTS

| | | | | |
|---|---|---|---|---|
| 652,331 | A | 6/1900 | Rudolph | |
| 1,157,008 | A | 10/1915 | Lang | |
| 3,204,866 | A | 9/1965 | Brighton | |
| 4,923,080 | A | 5/1990 | Lounsbury | |
| 5,901,872 | A | 5/1999 | Zollinhofer et al. | |
| 5,984,134 | A | 11/1999 | Mario | |
| 6,234,339 | B1 | 5/2001 | Thomas | |
| 7,654,443 | B1 | 2/2010 | Fuller | |
| 7,922,029 | B1 * | 4/2011 | Aretz et al. | 220/661 |
| 7,992,742 | B1 * | 8/2011 | Kim | 220/495.08 |
| 2005/0224496 | A1 | 10/2005 | Moyer | |
| 2006/0261146 | A1 | 11/2006 | Sola Barbarin et al. | |

* cited by examiner

*Primary Examiner* — Robert J Hicks
(74) *Attorney, Agent, or Firm* — Emery L. Tracy; Ruth Eure

(57) ABSTRACT

A trash can assembly positionable upon a surface is provided. The assembly comprises a trash bag restable on a base having a back edge and a front edge. A back wail extends from the base and has a first and second back connection edges. A door is provided having first and second door connection edges. The first door connection edge is liingedly connected to the first back connection edge and closable to completely encase the trash bag between the back wall and the closed door. Upon the door being in the closed position, the distance of the first and second door connection edges to the back edge of the base is less than the distance of the first and second back connection edges to the front edge of the base. The trash bag is completely contained within the assembly and removable upon opening of the door.

20 Claims, 1 Drawing Sheet

TRASH CAN ASSEMBLY

The present application is a continuation-in-part of pending U.S. patent application Ser. No. 13/444,895, filed on Apr. 12, 2012, entitled "Trash Can Assembly", which claims the benefit of priority of provisional patent application Ser. No. 61/518,291, filed on May 3, 2011, entitled "Side Door Trash Can".

BACKGROUND OF THE INVENTION

This invention relates generally to a trash can assembly and, more particularly, the invention relates to a trash can assembly lending ease to the daily chore of throwing away garbage.

SUMMARY

The present invention is a trash can assembly positionable upon a surface. The trash can assembly comprises a trash bag and a base having a top surface, a bottom surface, a back edge, and a front edge. The trash bag is restable upon the top surface and the bottom surface restable upon the surface. A substantially U-shaped back wall extends from the base with the back wall having a first back connection edge and a second back connection edge. A substantially U-shaped door is provided having a first door connection edge and a second door connection edge. The first door connection edge is hingedly connected to the first back connection edge and closable to completely encase the trash bag between the back wall and the closed door. Upon the door being in the closed position, the distance of the first door connection edge and the second door connection edge to the back edge of the base is less than the distance of the first back connection edge and the second back connection edge to the front edge of the base. The trash bag is completely contained within the trash can assembly and removable upon opening of the door.

In addition, the present invention includes a trash can assembly positionable upon a surface. The trash can assembly comprises a trash bag and a base having a top surface, a bottom surface, a back edge, and a front edge. The trash bag is restable upon the top surface and the bottom surface restable upon the surface. A substantially U-shaped back wall extends from the base, the back wall having a first back connection edge and a second back connection edge. A substantially U-shaped door is provided having a first door connection edge and a second door connection edge. The first door connection edge is hingedly connected to the first back connection edge and closable to completely encase the trash bag between the back wall and the closed door. At least one locking mechanism releasably locks the second door connection edge of the door to the second back connection edge of the back wall. A closable lid is hingedly secured to the back wall for completely closing the trash can assembly. Upon the door being in the closed position, the distance of the first door connection edge and the second door connection edge to the back edge of the base is less than the distance of the first back connection edge and the second back connection edge to the front edge of the base. The trash bag is completely contained within the trash can assembly and removable upon opening of the door.

The present invention further includes a method for disposing of trash comprising providing a trash bag, providing a base having a top surface, a bottom surface, a back edge, and a front edge, resting the trash bag upon the top surface, providing a substantially U-shaped back wall extending from the base with the back wall having a first back connection edge and a second back connection edge, providing a substantially U-shaped door having a first door connection edge and a second door connection edge, hingedly connecting the first door connection edge hingedly connected to the first back connection edge, closing the door to completely encase the trash bag between the back wall and the closed door, and positioning the distance of the first door connection edge and the second door connection edge to the back edge of the base less than the distance of the first back connection edge and the second back connection edge to the front edge of the base.

DETAILED DESCRIPTION OF THE PREFERRED EMBODIMENTS

Figure 2:
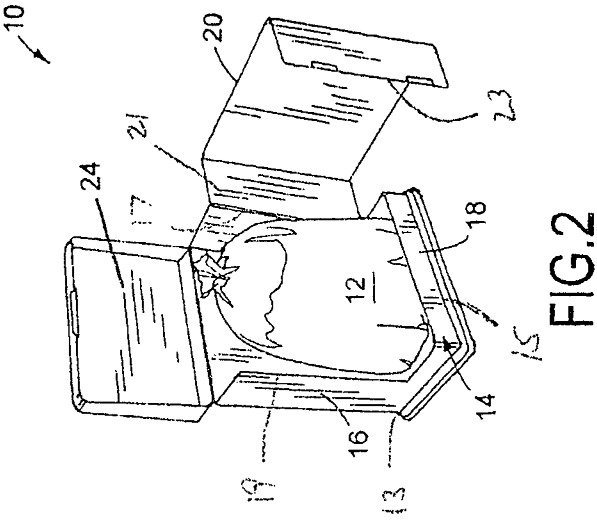
FIG. 2 is a perspective view illustrating the trash can assembly, constructed in accordance with the present invention, with the trash can assembly being in an open configuration.
Figure 1:
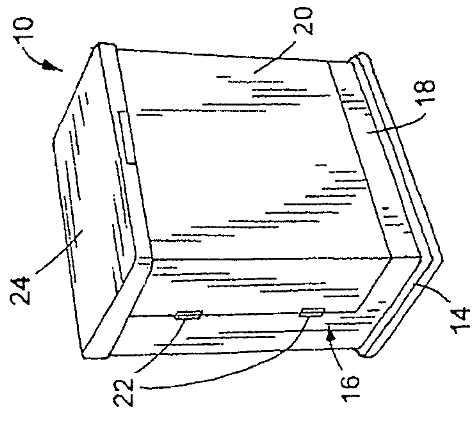
FIG. 1 is a perspective view illustrating a trash can assembly, constructed in accordance with the present invention, with the trash can assembly being in a closed configuration.

As illustrated in FIGS. 1 and 2, the present invention is a trash can assembly, indicated generally at 10, lending ease to the daily chore of throwing away garbage in garbage bags 12. The trash can assembly 10 of the present invention ranges in size from small to medium to large (varying from smaller 10 gallon disposals, to 30 and 40 gallons, depending upon usage), as will be described in further detail below.

The trash can assembly 10 of the present invention includes a base 14 having a bottom surface, a top surface, a rear edge 13, and a front edge 15. The bottom surface is restable upon a floor or the like and the trash bag 12 is restable upon the top surface. A U-shaped back wall 16 extends upward from the top surface of the base 14 leaving a front area open. The back wall 16 includes a first back connection edge 17 and a second back connection edge 19. A lip 18 or extension extends from the top surface of the base 14 about the front area thereby inhibiting trash bags 12 within the trash can assembly 10 from sliding out and for catching trash or other debris that may spill from the trash bag 12.

In addition, the trash can assembly 10 of the present invention includes a U-shaped door 20 having a first door connection edge 21 and a second door connection edge 23. The first door connection edge 21 of the door 20 is hingedly connected to the first back connection edge 17 of the back wall 16 with the door 20 closable about the front area until the second door connection edge 23 of the door 20 is positioned either adjacent or contacting the second back connection edge 19 of the back wall 16. At least one locking mechanism 22 along the second back connection edge 19 of the back wall 16 and the second door connection edge 23 of the door 20 releasably locks the door 20 to the back wall 16 in the closed position. Release of the locking mechanism 22 allows the door 20 to be opened for access to the trash bag 12 within the trash can assembly 10. A closable lid 24 hingedly secured to the back wall 16 closes the trash can assembly 10 and hides the trash bag therein. A recess or the like can be formed between the lid 24 and the door 20 for allowing a user to easily grasp the lid 24 for opening.

In a preferred embodiment of the trash can assembly 10 of the present invention, when the door 20 is in the closed position, the first door connection edge 21 and the second door connection edge 23 of the door 20 is positioned closer to the back edge 13 of the base 14 than the position of the first back connection edge 17 and the second back connection edge 19 of the back wall 16. By making sides of the U-shaped door 20 longer than the sides of the U-shaped back wall 16, the user is able to easily remove the trash bag from the trash can assembly 10 without tearing or otherwise compromising the integrity of the trash bag when the door 20 is in the open position. In fact, the user should be able to even remove the trash bag at an angle, rather than only straight out the front as required by other trash cans allowing the user the ability to empty a trash can assembly located in a tight or hard to reach place.

In another preferred embodiment, the trash can assembly 10 of the present invention is constructed of a durable plastic material and is configured in a rectangular and square version. The trash can assembly 10 can include a rubber gasket between the door 14 and the back wall 16 to contain leaks to within the trash can assembly 10. The rubber gasket can be positioned at any location that the door 20 contacts the back wall 16 and the base 14.

Unlike a standard garbage unit, the trash can assembly 10 of the present invention possesses one, preferably two, easy to open locks between the back wall 16 and the door 20 that allows easy access to and disposal of the trash bag inside. The trash can assembly 10 comes in various colors and finishes to match the interior of one's kitchen (or any other room that it needs to coordinate with for that matter). The trash can assembly 10 is preferably composed of an anti-microbial plastic to further ensure a hygienic option to other trash cans currently available on the market. Another consideration is for the trash can assembly 10 to come in various manifestations, including a stainless steel version for more high-end locales. The trash can assembly 10 is not limited to residential use, as the trash can assembly 10 can be utilized in industrial settings as well.

The benefits and advantages of the trash can assembly 10 of the present invention are plentiful. No longer will removing a garbage bag from a trash can be an arduous frustrating task. With the simple unlocking of the locks and opening of the door, the user can easily grab the trash bag and pull it out without it getting stuck in the can, forcing the user to handle the trash bag and get it out. Not only can this cause the trash bag to tear or break, but it forces the user to handle the garbage an abnormally unhygienic amount. Disposing of garbage is a simple and effortless chore that can be reduced to under a minute. With the hygienic factor, also comes the streamlining ability to save time and avoid physical contact and struggle. For those who are handicapped or older, the trash can assembly 10 can be an absolute must, and the benefits also apply to young people as well. Parents attempting to teach their children the importance of chores and participation in household duties, can easily take on the task of taking out the trash each day with little complaints or difficulty. The trash can assembly 10 is a hygienic, and more importantly, ergonomic solution to the age-old problem of struggling to get the garbage bag out of the trash can.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein may be suitably practiced in the absence of the specific elements which are disclosed herein.

What is claimed is:

1. A trash can assembly positionable upon a surface, the trash can assembly comprising:

a trash bag;

a base having a top surface, a bottom surface, a back edge, and a front edge, the trash bag restable upon the top surface and the bottom surface restable upon the surface;

a substantially U-shaped back wall extending from the base, the back wall having a first back connection edge and a second back connection edge; and a substantially U-shaped door having a first door connection edge and a second door connection edge, the first door connection edge hingedly connected to the first back connection edge and closable to completely encase the trash bag between the back wall and the closed door;

wherein upon the door being in the closed position, the distance of the first door connection edge and the second door connection edge to the back edge of the base is less than the distance of the first back connection edge and the second back connection edge to the front edge of the base; and wherein the trash bag is completely contained within the trash can assembly and removable upon opening of the door.

2. The trash can assembly of claim 1 and further comprising:

a lip extending from the top surface of the base about an area of the base free from the back wall.

3. The trash can assembly of claim 1 and further comprising:

at least one locking mechanism for releasably locking the door to the back wall.

4. The trash can assembly of claim 1 and further comprising:

a closable lid hingedly secured to the back wall for completely closing the trash can assembly.

5. The trash can assembly of claim 1 and further comprising:

a recess formed between the lid and the door for allowing a user to easily grasp the lid for opening.

6. The trash can assembly of claim 1 wherein the trash can assembly is constructed of a durable plastic material and is configured in a rectangular and square version.

7. The trash can assembly of claim 6 wherein the trash can assembly is composed of an anti-microbial plastic.

8. The trash can assembly of claim 1 and further comprising:

a rubber gasket between the door and the back wall to contain leaks to within the trash can assembly.

9. A trash can assembly positionable upon a surface, the trash can assembly comprising:

a trash bag;

a base having a top surface, a bottom surface, a back edge, and a front edge, the trash bag restable upon the top surface and the bottom surface restable upon the surface;

a substantially U-shaped back wall extending from the base, the back wall having a first back connection edge and a second back connection edge;

a substantially U-shaped door having a first door connection edge and a second door connection edge, the first door connection edge hingedly connected to the first back connection edge and closable to completely encase the trash bag between the back wall and the closed door;

at least one locking mechanism for releasably locking the second door connection edge of the door to the second back connection edge of the back wall; and a closable lid hingedly secured to the back wall for completely closing the trash can assembly;

wherein upon the door being in the closed position, the distance of the first door connection edge and the second door connection edge to the back edge of the base is less than the distance of the first back connection edge and the second back connection edge to the front edge of the base; and wherein the trash bag is completely contained within the trash can assembly and removable upon opening of the door.

10. The trash can assembly of claim 9 and further comprising:

a rubber gasket between the door and the back wall to contain leaks to within the trash can assembly.

11. The trash can assembly of claim 9 and further comprising:

a lip extending from the top surface of the base about an area of the base free from the back wall.

12. The trash can assembly of claim 9 and further comprising:

a recess formed between the lid and the door for allowing a user to easily grasp the lid for opening.

13. The trash can assembly of claim 9 wherein the trash can assembly is constructed of a durable plastic material and is configured in a rectangular and square version.

14. The trash can assembly of claim 13 wherein the trash can assembly is composed of an anti-microbial plastic.

15. The trash can assembly of claim 9 wherein the trash can assembly has a substantially rectangular cross-sectional configuration.

16. A method for disposing of trash comprising:

providing a trash bag;

providing a base having a top surface, a bottom surface, a back edge, and a front edge;

resting the trash bag upon the top surface;

providing a substantially U-shaped back wall extending from the base, the back wall having a first back connection edge and a second back connection edge;

providing a substantially U-shaped door having a first door connection edge and a second door connection edge;

hingedly connecting the first door connection edge hingedly connected to the first back connection edge;

closing the door to completely encase the trash bag between the back wall and the closed door; and positioning the distance of the first door connection edge and the second door connection edge to the back edge of the base less than the distance of the first back connection edge and the second back connection edge to the front edge of the base.

17. The method of claim 16 and further comprising:

extending a lip from the top surface of the base about an area of the base free from the back wall.

18. The method of claim 16 and further comprising:

releasably locking the door to the back wall.

19. The method of claim 16 and further comprising:

hingedly secured a lid to the back wall for completely closing the trash can assembly.

20. The method of claim 15 and further comprising:

positioning a rubber gasket between the door and the back wall; and containing leaks to within the trash can assembly.

* * * * *